US006834680B2

(12) United States Patent
Baugh

(10) Patent No.: US 6,834,680 B2
(45) Date of Patent: Dec. 28, 2004

(54) METHOD OF PURGING LIQUIDS FROM PISTON ACCUMULATORS

(76) Inventor: Benton F. Baugh, 14626 Oak Bend, Houston, TX (US) 77079

( * ) Notice: Subject to any disclaimer, the term of this patent is extended or adjusted under 35 U.S.C. 154(b) by 0 days.

(21) Appl. No.: 10/314,361

(22) Filed: Dec. 9, 2002

(65) Prior Publication Data

US 2004/0108008 A1 Jun. 10, 2004

(51) Int. Cl.$^{7}$ .................................................. F16L 55/04
(52) U.S. Cl. ............................................ 138/31; 138/30
(58) Field of Search ...................................... 138/30, 31

(56) References Cited

U.S. PATENT DOCUMENTS 2,753,892 A * 7/1956 Deardorff et al. ............. 138/31
3,677,001 A 7/1972 Childers
3,875,365 A * 4/1975 Beneteau ..................... 219/89
4,667,699 A * 5/1987 Loliger ......................... 138/31
4,685,491 A * 8/1987 Fulmer et al. ................ 138/31
4,777,800 A 10/1988 Hay
4,953,591 A * 9/1990 Takagi et al. .......... 137/565.34
5,024,250 A * 6/1991 Nakamura ................... 138/31
5,031,664 A * 7/1991 Alaze .......................... 138/31
6,202,753 B1 3/2001 Baugh

* cited by examiner

*Primary Examiner*—James Hook

(57) ABSTRACT

The method of providing a piston type accumulator with a controlled depth liquid shield on the top of a piston with seals separating a pressurized gas from the seals sealing the pressurized liquid comprising providing a portion of the gas in a chamber portion above said piston and a portion of the gas in a chamber portion not above said piston such that liquids accumulating in the chamber above the piston can be vented into the chamber not above the piston for venting to a location outside said chambers.

13 Claims, 5 Drawing Sheets

METHOD OF PURGING LIQUIDS FROM PISTON ACCUMULATORS

CROSS-REFERENCE TO RELATED APPLICATIONS

N/A

STATEMENT REGARDING FEDERALLY SPONSORED RESEARCH OR DEVELOPMENT

N/A

INCORPORATION-BY-REFERENCE OF MATERIAL SUBMITTED ON A COMPACT DISK

N/A

BACKGROUND OF THE INVENTION

The field of this invention is that of deepwater accumulators for the purpose of providing a supply of pressurized working fluid for the control and operation of equipment. Typical equipment includes, but is not limited to, blowout preventers (BOP) which are used to shut off the well bore to secure an oil or gas well from accidental discharges to the environment, gate valves for the control of flow of oil or gas to the surface or to other subsea locations, or hydraulically actuated connectors and similar devices. The fluid to be pressurized is typically an oil based product or a water based product with additives lubricity and corrosion protection.

Currently accumulators come in three styles and operate on a common principle. The principle is to precharge them with pressurized gas to a pressure at or slightly below the anticipated minimum pressure required to operate equipment. Fluid can be added to the accumulator, increasing the pressure of the pressurized gas and the fluid. The fluid introduced into the accumulator is therefore stored at a pressure at least as high as the precharge pressure and is available for doing hydraulic work.

The accumulator styles are bladder type having a balloon type bladder to separate the gas from the fluid, the piston type having a piston sliding up and down a seal bore to separate the fluid from the gas, and a float type with a float providing a partial separation of the fluid from the gas and for closing a valve when the float approaches the bottom to prevent the escape of gas.

Accumulators providing typical 3000 p.s.i. working fluid to surface equipment can be of a 5000 p.s.i. working pressure and contain fluid which raises the precharge pressure from 3000 p.s.i. to 5000 p.s.i.

As accumulators are used in deeper water, the efficiency of conventional accumulators is decreased. In 1000 feet of seawater the ambient pressure is approximately 465 p.s.i. For an accumulator to provide a 3000 p.s.i. differential at 1000 ft. depth, it must actually be precharged to 3000 p.s.i. plus 455 p.s.i. or 3465 p.s.i.

At slightly over 4000 ft. water depth, the ambient pressure is almost 2000 p.s.i., so the precharge would be required to be 3000 p.s.i. plus 2000 p.s.i. or 5000 p.s.i. This would mean that the precharge would equal the working pressure of the accumulator. Any fluid introduced for storage would cause the pressure to exceed the working pressure, so the accumulator would be non-functonal.

Another factor which makes the deepwater use of conventional accumulators impractical is the fact that the ambient temperature decreases to approximately 35 degrees F. If an accumulator is precharged to 5000 p.s.i. at a surface temperature of 80 degrees F., approximately 416 p.s.i. precharge will be lost simply because the temperature was reduced to 35 degrees F. Additionally, the rapid discharge of fluids from accumulators and the associated rapid expansion of the pressurizing gas causes a natural cooling of the gas. If an accumulator is quickly reduced in pressure from 5000 p.s.i. to 3000 p.s.i. without chance for heat to come into the accumulator (adiabatic), the pressure would actually drop to 2012 p.s.i.

A fourth type accumulator has been developed which is one which is pressure compensated for depth, and is illustrated in the U.S. Pat. No. 6,202,753. This style operates effectively like a summing relay to add the nitrogen precharge pressure plus the ambient seawater pressure to the working fluid. This means that irrespective of the seawater depth (pressure), the working fluid will always have a greater pressure available for work by the amount of the nitrogen precharge.

This "pressure compensated" style has numerous advantages in addition to the pressure compensation. It allows lower gas pressures with associated safety, eliminates the need to recharge the system for differing operational depths, and eliminates expensive mistakes in setting the charge pressures.

The pressure compensated type has exhibited two disadvantages. First it has required a relatively high pressure seal between the nitrogen chamber and the working fluid chamber. Very smooth seal surfaces are required to seal the nitrogen at relatively high pressures, and nitrogen still will tend to leak past the seals during dynamic movement. Secondly, there is some chance that the liquids will go past the seals and into the nitrogen chamber on one end and into the vacuum chamber on the opposite end and prevent effective performance of the accumulator.

BRIEF SUMMARY OF THE INVENTION

The object of this invention is to provide a pressure compensated accumulator for deepwater ocean service which does not require a high pressure gas seal between a nitrogen chamber and an oil chamber.

A second object of the present invention is to provide a pressure compensated accumulator for deepwater ocean service which can prevent the accumulation of liquids in the vacuum chamber.

A third object of the present invention is to provide a pressure compensated accumulator for deepwater ocean service which can prevent the accumulation of liquids in the nitrogen chamber.

DETAILED DESCRIPTION OF THE INVENTION

Figure 1:
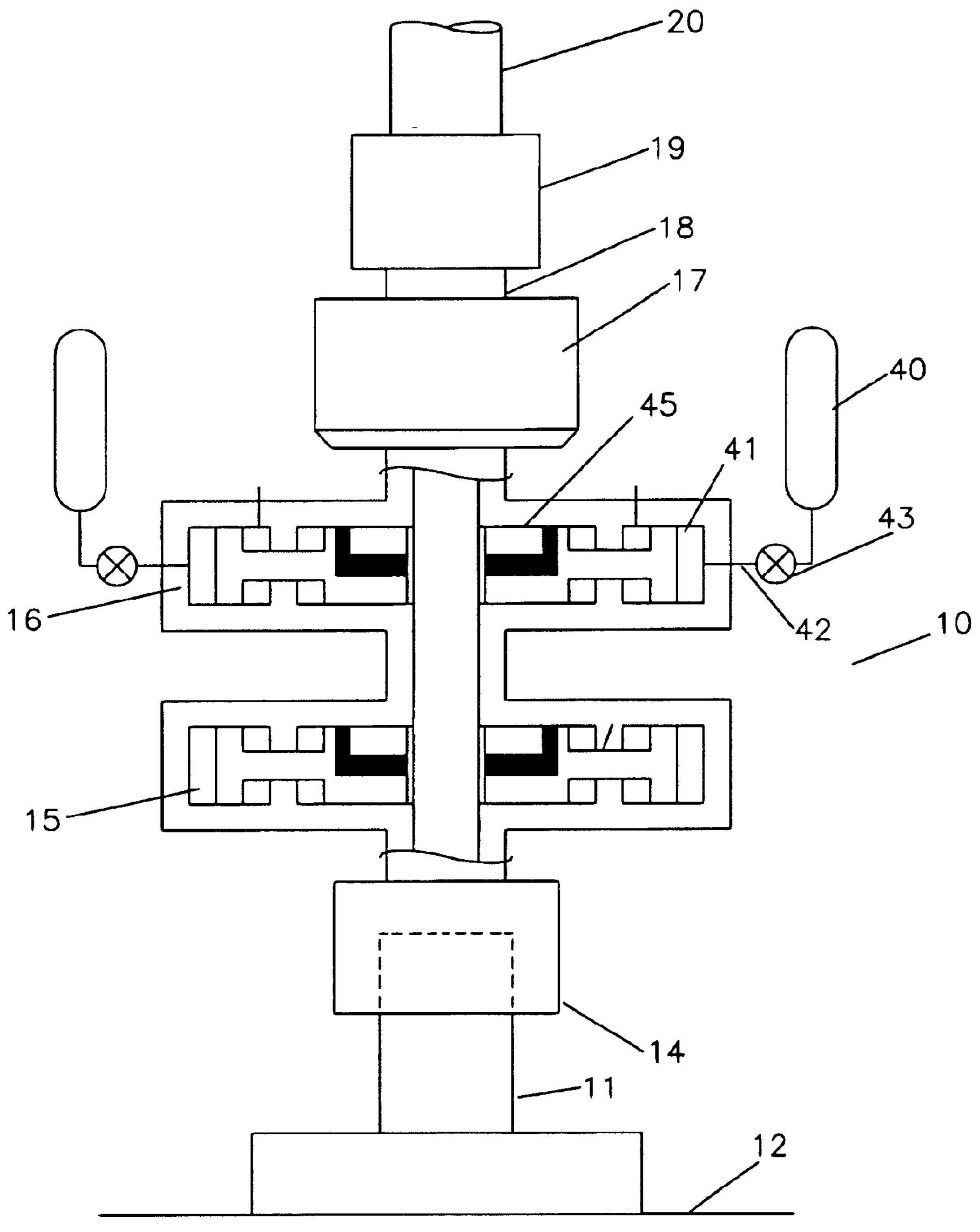
FIG. 1 is a partial section thru a subsea blowout preventer stack showing applications of principles of this invention.

Referring now to FIG. 1, a blowout preventer (BOP) stack 10 is landed on a subsea wellhead system 11, which is supported above mudline 12. The BOP stack 10 is comprised of a wellhead connector 14 which is typically hydraulically locked to the subsea wellhead system 11, multiple ram type blowout preventers 15 and 16, an annular blowout preventer 17 and an upper mandrel 18. A riser connector 19, and a riser 20 to the surface are attached for communicating drilling fluids to and from the surface.

Blowout preventer 16 shows that an accumulator 40 of this invention being connected to one of the outer cavities 41 thru line 42 and valve 43. If the valve 43 is opened, fluid pressure from accumulator 40 will move the ram 45 toward the center of the vertical bore (and seal against an opposing ram similarly moved). Accumulator 40 can be any of the types described in the description above.

Figure 2:
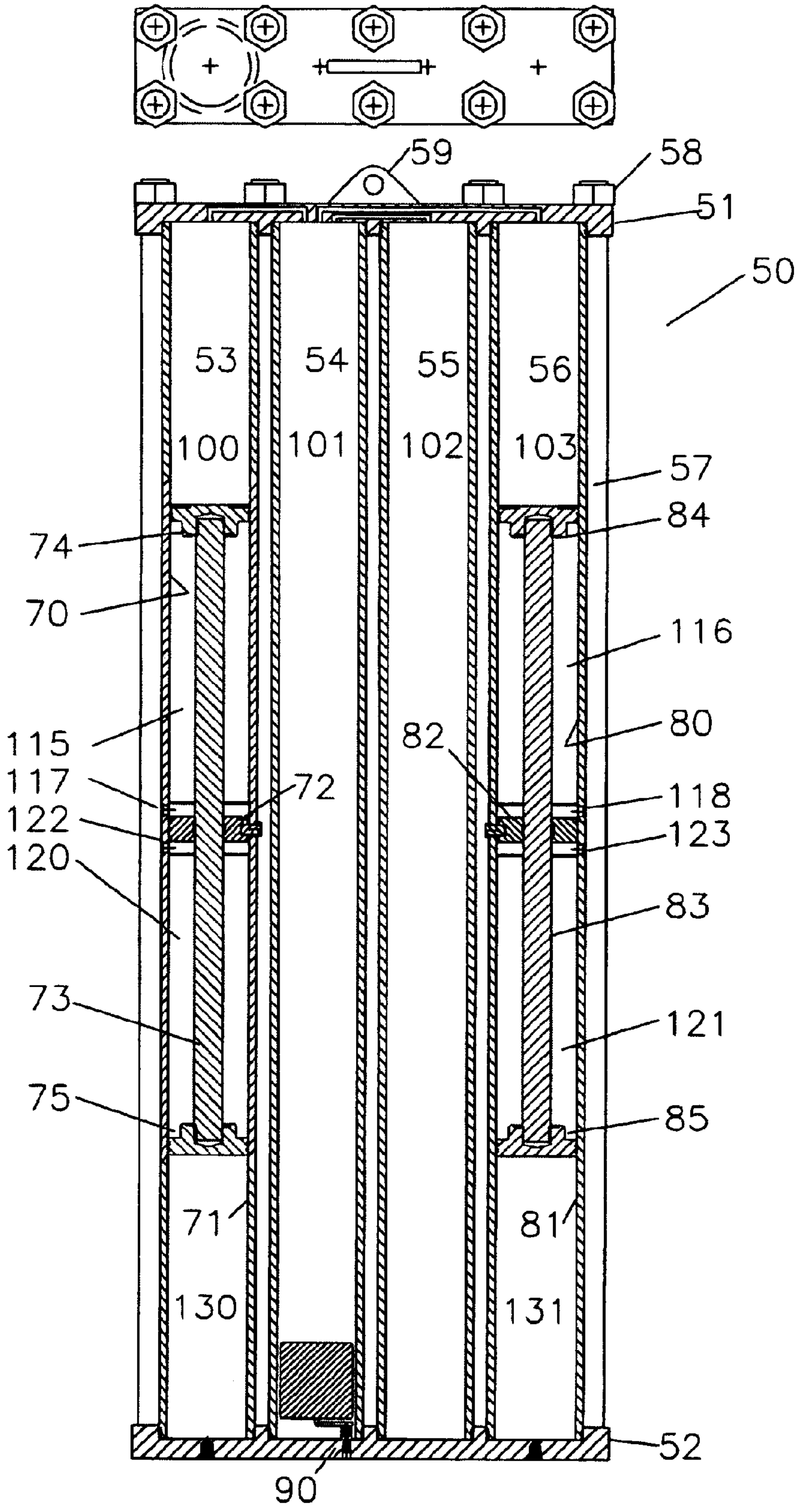
FIG. 2 is a half section of an accumulator of the present invention.

Referring now to FIG. 2, accumulator 50 has an upper plate 51, a lower plate 52, a first cylinder 53, a second cylinder 54, a third cylinder 55, a fourth cylinder 56, connecting bolts 57, connecting nuts 58, and lifting eye 59.

First cylinder 53 has an upper bore 70, a lower bore 71, a bulkhead 72, a cylinder rod 73, an upper piston 74, and a lower piston 75. Fourth cylinder 56 has an upper bore 80, a lower bore 81, a bulkhead 82, a cylinder rod 83, an upper piston 84, and a lower piston 85.

Second cylinder 54 is empty except for pressurized gas and a valve assembly 90 near the bottom. Third cylinder 55 is empty except for pressurized gas.

Chambers 100, 101, 102, and 103 are pressurized with a gas such as nitrogen or helium. Chambers 115 and 116 contain a working fluid accessible thru ports 117 and 118.

Chambers 120 and 121 contain sea water and the resultant sea water pressure which comes in thru ports 122 and 123, respectively.

Chambers 130 and 131 contain a vacuum or may simply be allowed to have atmospheric pressure at the surface at assembly which will effectively be a vacuum in deep water.

Figure 3:
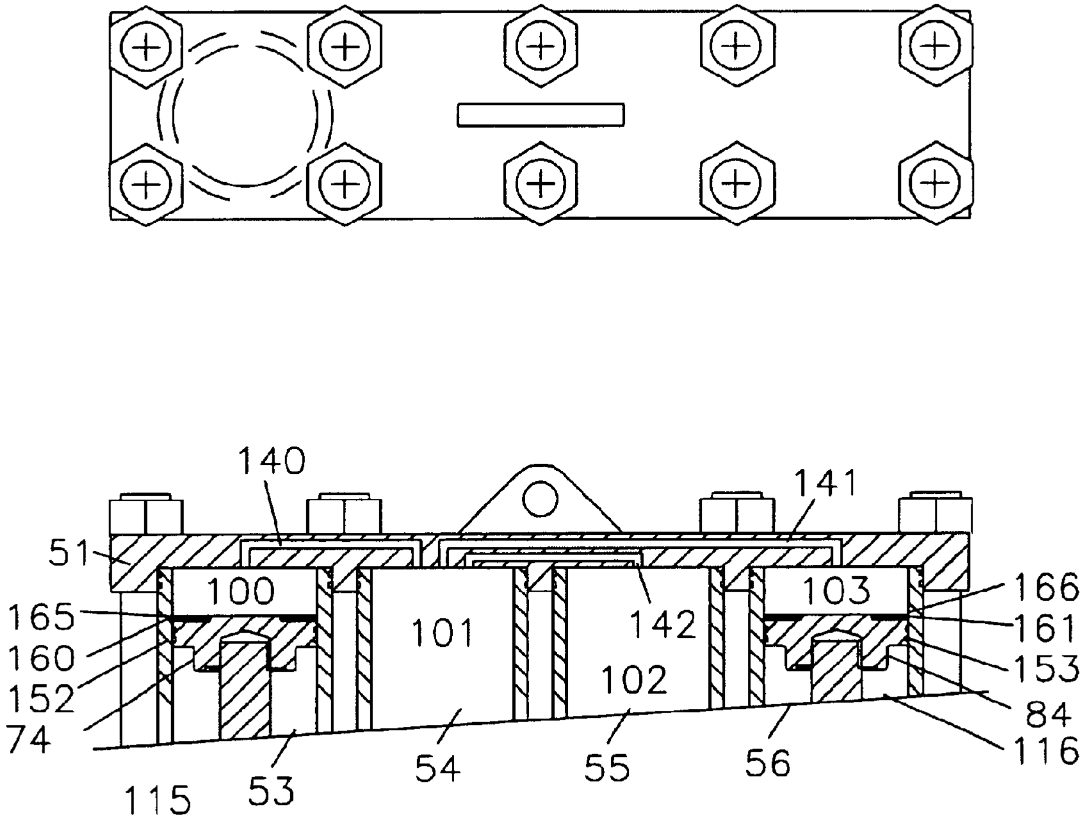
FIG. 3 is a partial section of the top portion of the accumulator of this invention.

Referring now to FIG. 3, upper plate 51 has port 140 communicating the top of first cylinder 53 with second cylinder 54, port 141 communicating fourth cylinder 56 with second cylinder 54, and port 142 communicating third cylinder 55 with second cylinder 54. As the top of all four cylinders are interconnected, the volumes of top of the four cylinders are combined to provide a gas spring on the top of the two pistons 74 and 84.

Pistons 74 and 84 contains seals 152 and 153 respectively to seal between the gas chamber 100 and 103 and the working fluid chambers 115 and 116.

Recesses 160 and 161 on the upper sides of pistons 74 and 84 serve to hold fluid 165 and 166. The retention of the fluid 165 and 166 in the recesses 160 and 161 serves to prevent the pressurized gas at 100 and 103 from tending to leak past the seals 152 and 153. As liquids are characteristically easier to seal than gasses, the insurance of liquids on both sides of the seal will improve the quality of the sealing.

If not for the recess, as piston 74 goes to the top of the stroke of cylinder 53, all of the liquid might be expelled thru port 140 and dumped into second cylinder 54. Likewise the liquid in the top portion of fourth cylinder 54 might be expelled thru port 141 into second cylinder 54.

Alternately, if during the service life of the accumulator, an excess amount of liquid from chamber 115 passes by seal 152 into chamber 100, the excess amount of liquid will be expelled into the second chamber 54 and excess liquids from fourth cylinder 56 will also be expelled into second cylinder 54.

Figure 4:
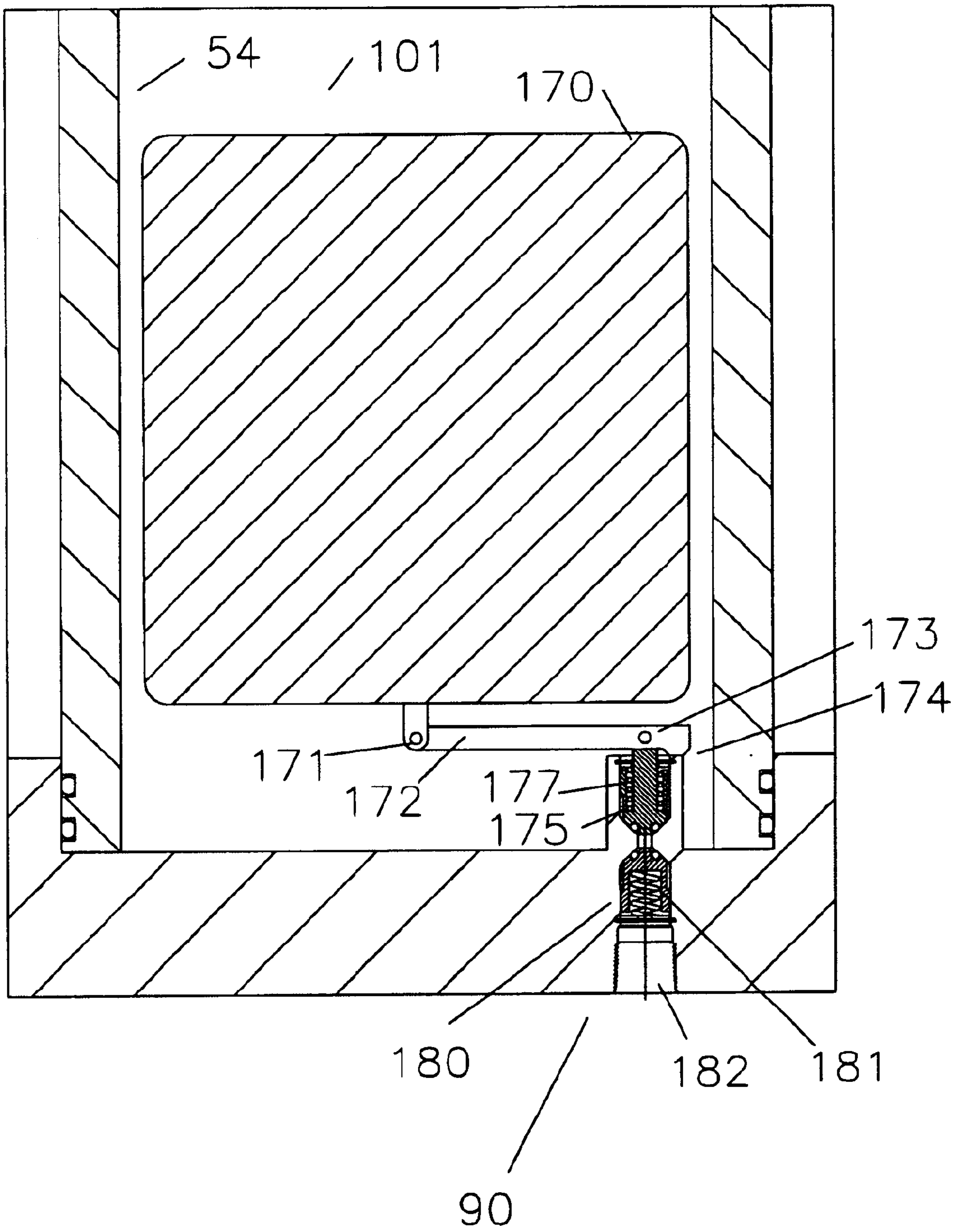
FIG. 4 is a partial section of the accumulator of this invention showing means to exhaust accumulated liquids from the nitrogen chamber.

Referring now to FIG. 4 a lower portion of second cylinder 54 is shown. When excess amount of fluid is vented into second cylinder 54, float 170 is raised pulling pin 171, link 172, and pin 173 up while pivoting up on shoulder 174. As pin 173 is pulled up valve 175 moves up and opens against spring 177. At this time the high gas pressure in chamber 101 pushes the excess liquid out until the float 170 lowers and allows the valve 175 to close. The excess liquid move out through check 180 to vent out port 182 to the ocean. The check 180 will then be closed by spring 181. In this way, a single valve assembly 90 can remove any excess fluids which may be vented past the seals on either piston 74 or 84.

Figure 5:
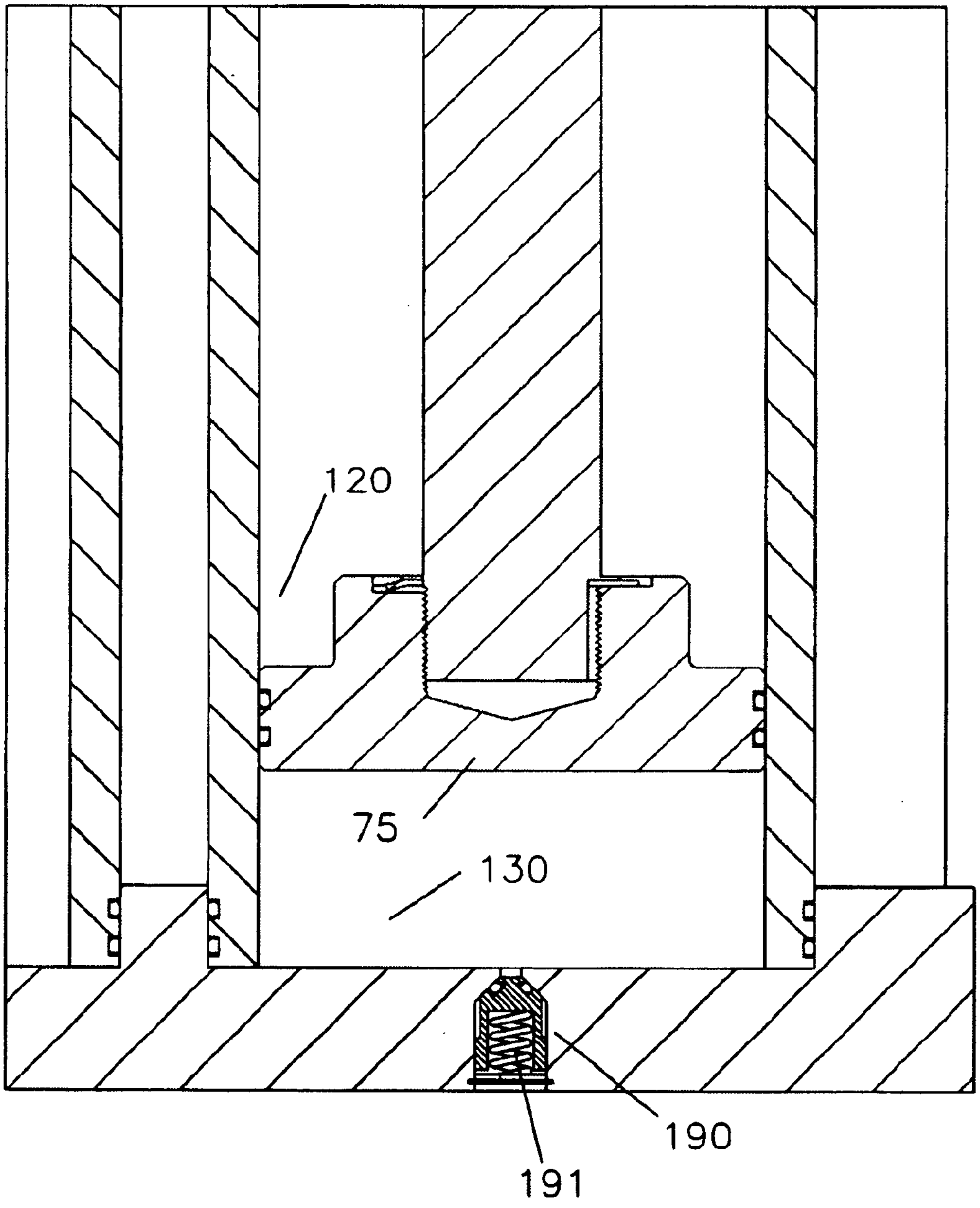
FIG. 5 is a partial section of the accumulator of this invention showing the lower portion of the vacuum portion of the accumulator.

Referring now to FIG. 5, a partial section of the bottom of cylinder 53 is shown. In this case a check valve 190 is provided with a spring 191. If the piston 192 is simply lowered to the bottom of the stroke by the pressure of the gas from the top of the upper piston 74, a high pressure will be generated in any liquid trapped at the bottom of the cylinder. The pressure will approximately be the sum of the pressure of the seawater entering port 122 plus the pressure of the gas in chamber 100. As the total pressure will exceed the seawater pressure (i.e. at port 122), any liquids in chamber 130 will be expelled past check valve 190.

In this way, the manufacturing convenience of a four cylinder accumulator bank is complimented with the ability to remove any collection of liquids by a single valve assembly 90, and each of the lower vacuum chambers can be purged by a simple check valve assembly.

The foregoing disclosure and description of this invention are illustrative and explanatory thereof, and various changes in the size, shape, and materials as well as the details of the illustrated construction may be made without departing from the spirit of the invention.

SEQUENCE LISTING

N/A

What is claimed is:

1. The method of providing a piston type accumulator with compressed gas in a first chamber on one side of a piston and hydraulic fluid in a second chamber on the opposite side of said piston and with a controlled depth liquid shield on the top of a piston separating said pressurized gas from the seals on said piston comprising providing a portion of the gas in a first portion of said first chamber above said piston and a portion of the gas in a second portion of said first chamber not above said piston such that excess liquids accumulating said first portion of said first chamber above the piston can be vented into said second portion of said second chamber for venting to a location outside of said first chamber, using the gas pressure in said second portion of said first chamber to expel a portion of the excess liquids from said second portion of said first chamber, and using the level of the excess liquids in said second portion of said first chamber to raise a float to open a valve to allow the gas pressure in said second portion of said first chamber to expel the excel liquids from said second portion of said first chamber.

2. The method of claim 1, further comprising that before the level of the liquid is lowered enough to allow gas to be vented from said second portion of said first chamber, said float is lowered and allows said valve to close.

3. In an accumulator with compressed gas in a first chamber on one side of a piston and hydraulic fluid in a second chamber on the opposite side of said piston, the method of providing the accumulation of a desired amount of liquids on the compressed gas side of said piston to isolate the seals on said piston from direct contact with gas pressure, comprising providing a supply of liquids on top of said piston between said piston and said compressed gas, and providing a vent path which directs any excess accumulation of liquids out of said first chamber, further comprising said first chamber being separated into a first portion of said first chamber above said piston and a second portion of said first chamber not above said piston, using the gas pressure in said second portion of said first chamber to expel a portion of the excess liquids from said second portion of said first chamber, and using the level of the excess liquids in said second portion of said first chamber to raise a float to open a valve to allow the gas pressure in said second portion of said first chamber to expel the expel liquids from said second portion of said first chamber.

4. The method of claim 3, further comprising that before the level of the liquid is lowered enough to allow gas to be vented from said second portion of said first chamber, said float is lowered and allows said valve to close.

5. In an accumulator with compressed gas in a first chamber on one side of a piston and hydraulic fluids in a second chamber on the opposite side of said piston, the method of preventing the accumulation of liquid in excess of a predetermined amount on the compressed gas side of said piston, comprising providing a valve which opens in response to a fluid level in said first chamber being in excess of a predetermined level, and using the pressure of said compressed gas to purge said liquids from said first chamber through said valve to a location outside of said first chamber.

6. The method of claim 5, further comprising the pressure in the gas above said piston is lower than the pressure of the liquids below said piston.

7. The method of claim 5, further comprising said first chamber being separated into a first portion of said first chamber above said piston and a second portion of said first chamber not above said piston.

8. The method of claim 7, wherein said valve is a float operated valve.

9. The method of claim 8, further comprising that before the level of the liquid is lowered enough to allow gas to be vented from said second portion of said first chamber, said float is lowered and allows said valve to close.

10. The method of claim 7, wherein said valve is operated by electricity, air pressure, or hydraulic pressure.

11. The method of claim 10, wherein said electricity, air, or hydraulic pressure provided to operate said valve is in response to a measure of the depth of the liquid in said second portion of said first chamber.

12. The method of claim 11 wherein said measure of depth is done acoustically.

13. The method of claim 11 wherein said measure of depth is done with a laser.

* * * * *